(12) United States Patent
Zhao et al.

(10) Patent No.: US 12,153,475 B2
(45) Date of Patent: Nov. 26, 2024

(54) HINGE AND MOBILE TERMINAL HAVING INWARD-FOLDABLE FLEXIBLE SCREEN

(71) Applicant: Hangzhou Amphenol Phoenix Telecom Parts Co., Ltd., Hangzhou (CN)

(72) Inventors: Jingyu Zhao, Hangzhou (CN); Yinliang Yan, Hangzhou (CN); Minjie Gao, Hangzhou (CN)

(73) Assignee: HANGZHOU AMPHENOL PHOENIX TELECOM PARTS CO., LTD., Hangzhou (CN)

(*) Notice: Subject to any disclaimer, the term of this patent is extended or adjusted under 35 U.S.C. 154(b) by 0 days.

(21) Appl. No.: 18/572,607

(22) PCT Filed: Jun. 20, 2022

(86) PCT No.: PCT/CN2022/099767
§ 371 (c)(1),
(2) Date: Dec. 20, 2023

(87) PCT Pub. No.: WO2023/273932
PCT Pub. Date: Jan. 5, 2023

(65) Prior Publication Data
US 2024/0264641 A1    Aug. 8, 2024

(30) Foreign Application Priority Data
Jun. 29, 2021 (CN) .................. 202121464388.2

(51) Int. Cl.
*G06F 1/16* (2006.01)

(52) U.S. Cl.
CPC ................... *G06F 1/1681* (2013.01)

(58) Field of Classification Search
CPC ..................................... G06F 1/1681
See application file for complete search history.

(56) References Cited

U.S. PATENT DOCUMENTS 11,231,752 B2 *  1/2022  Liu ................ H04M 1/0216
11,467,633 B2 * 10/2022  Liao ..................... F16C 11/04
(Continued)

FOREIGN PATENT DOCUMENTS

CN    212407305 U    1/2021
CN    212413208 U    1/2021
(Continued)

*Primary Examiner* — Lisa Lea-Edmonds
(74) *Attorney, Agent, or Firm* — MUNCY, GEISSLER, OLDS & LOWE, P.C.

(57) ABSTRACT

A hinge and a mobile terminal having an inward-foldable flexible screen. The hinge includes a left rotating support, a right rotating support, a left middle rotating supporting component, and a right middle rotating supporting component; the left rotating support and the right rotating support are respectively provided with supporting parts for the left middle rotating supporting component and the right middle rotating supporting component during being unfolded; the left middle rotating supporting component and the right middle rotating supporting component are separately connected to an elastic component; and when the hinge is folded, the elastic component drives the left middle rotating supporting component and the right middle rotating supporting component to downwardly rotate so as to rotate into a middle housing of the mobile terminal.

5 Claims, 2 Drawing Sheets

(56) References Cited

U.S. PATENT DOCUMENTS

| | | | |
|---|---|---|---|
| 11,914,433 B2 * | 2/2024 | Liao | G06F 1/1652 |
| 11,956,378 B2 * | 4/2024 | Kang | G06F 1/1616 |
| 11,960,328 B2 * | 4/2024 | Jiang | G06F 1/1652 |
| 11,991,301 B2 * | 5/2024 | Ge | G06F 1/1616 |
| 2021/0181808 A1 * | 6/2021 | Liao | G06F 1/1652 |
| 2022/0070285 A1 * | 3/2022 | Ge | H04M 1/0216 |
| 2023/0007797 A1 * | 1/2023 | Jiang | H05K 5/0226 |
| 2023/0054923 A1 * | 2/2023 | Liao | G06F 1/1616 |
| 2023/0156942 A1 * | 5/2023 | Ge | H04M 1/022 |
| | | | 361/807 |
| 2023/0221773 A1 * | 7/2023 | Zhang | F16C 11/12 |
| | | | 361/679.27 |
| 2023/0236635 A1 * | 7/2023 | Liu | F16C 11/10 |
| | | | 361/679.21 |
| 2024/0032226 A1 * | 1/2024 | Jiang | G06F 1/1652 |
| 2024/0040021 A1 * | 2/2024 | Yao | H04M 1/0216 |
| 2024/0040725 A1 * | 2/2024 | Wang | H04M 1/02 |
| 2024/0160253 A1 * | 5/2024 | Liao | H04M 1/0268 |

FOREIGN PATENT DOCUMENTS

| | | |
|---|---|---|
| CN | 212564044 U | 2/2021 |
| CN | 212899353 U | 4/2021 |
| CN | 215861291 U | 2/2022 |
| WO | WO2018090888 A1 | 5/2018 |

* cited by examiner

HINGE AND MOBILE TERMINAL HAVING INWARD-FOLDABLE FLEXIBLE SCREEN

FIELD OF THE INVENTION

The present invention relates to a hinge and a mobile terminal having an inward-foldable flexible screen using the hinge.

BACKGROUND OF THE INVENTION

For a mobile terminal having an inward-foldable flexible screen, a certain structural measures will be taken for the bulging shape of the bending portion of the flexible screen when it is folded. One treatment measurement is to set a lifting plate in the middle portion. When the mobile terminal having an inward-foldable flexible screen is folded, the lifting plate descends to receive the lower end of the bending portion of the flexible screen; when the mobile terminal having an inward-foldable flexible screen is unfolded, the lifting plate rises to the supporting height to support the flexible screen in the middle portion. Such a structure has proposed certain requirements for the thickness of the middle housing. If a customer requires a thinner flexible screen mobile terminal, it is difficult to adopt this structure.

SUMMARY OF THE INVENTION

An object of the present invention is to provide a new technical solution for the existing problems in the Background Art, which can be used in a mobile terminal having an inward-foldable flexible screen, and can receive the lower end of the bending portion of the flexible screen, and support the flexible screen at a middle portion when the mobile terminal having the inward-foldable flexible screen is unfolded, thereby reducing the thickness requirement for the middle housing. In order to achieve the object, the present invention adopts the following technical solutions:

A hinge, comprising a left rotating support and a right rotating support, the left rotating support and the right rotating support can respectively rotate with a first axis and a second axis as axes respectively, the first axis and the second axis are parallel, a synchronous reverse rotation connecting mechanism is connected between the left rotating support and the right rotating support to perform synchronous reverse rotation; wherein:

the hinge is further provided with a left middle rotating supporting component and a right middle rotating supporting component: the rotation axis of the left middle rotating supporting component is parallel to or coincides with the first axis, and the rotation axis of the right middle rotating supporting component is parallel to or coincides with the second axis;

the left rotating support and the right rotating support are respectively provided with supporting parts for the left middle rotating supporting component and the right middle rotating supporting component during being unfolded:

the left middle rotating supporting component and the right middle rotating supporting component are separately connected to an elastic component; and when the hinge is folded, the elastic component drives the left middle rotating supporting component and the right middle rotating supporting component to downwardly rotate so as to rotate into a middle housing of the mobile terminal.

Further, the hinge is provided with a first shaft and a second shaft, both the left middle rotating supporting component and the left rotating support are sleeved on the first shaft, the left rotating support and the first shaft are connected together to rotate synchronously, and the left middle rotating supporting component is rotatably connected to the first shaft: both the right middle rotating supporting component and the right rotating support are sleeved on the second shaft, the right rotating support and the second shaft are connected together to rotate synchronously, and the right middle rotating supporting component is rotatably connected to the second shaft.

Further, an elastic component of the left middle rotating supporting component is a torsional spring, and an elastic component of the right middle rotating supporting component is a torsional spring and the elastic components are connected together to be an integral spring, two end arms of the spring are connected to the left middle rotating supporting component and the right middle rotating supporting component respectively.

Further, the integral spring is provided with a left spring coil and a right spring coil, and the left spring coil and the right spring coil are sleeved outside the first shaft and the second shaft respectively.

Further, when the hinge is folded, the left middle rotating supporting component and the right middle rotating supporting component are driven by the elastic component to downwardly rotate into a middle housing of the mobile terminal until being blocked by a limiter, in the process from unfolding to folding of the hinge, rotation angles of the left middle rotating supporting component and the right middle rotating supporting component are smaller than rotation angles of the left rotating support and right rotating support respectively; in the process from folding to unfolding of the hinge, when the supporting parts of the left rotating support and the right rotating support are rotated to contact the left middle rotating supporting component and the right middle rotating supporting component respectively, the supporting parts drive the left middle rotating supporting component and the right middle rotating supporting component to rotate to a support position of the flexible screen, and in the support position of the flexible screen, the elastic component compresses the left middle rotating supporting component and the right middle rotating supporting component.

Another object of the present invention is to provide a mobile terminal having an inward-foldable flexible screen using the aforementioned hinge and achieve corresponding technical effects. To achieve the object, the present invention adopts the following technical solutions:

a mobile terminal having an inward-foldable flexible screen, comprising a middle housing, a left housing, a right housing and an inner flexible screen, wherein the mobile terminal having an inward-foldable flexible screen further comprises the aforementioned hinge, the left rotating support and the right rotating support are respectively connected with the rotation directions of the left housing and the right housing in a constrained manner, and the left middle rotating supporting component and the right middle rotating supporting component correspond to the positions of the middle housing.

Due to the adoption of the technical solutions of the present invention, the middle support plate is divided into the left and right middle support plates that do not rotate synchronously with the left and right rotating supports. When the hinge is folded, the left and right middle support plates are driven by an elastic component to rotate downwardly, and stop at the required position according to the setting position of the limiter, providing suitable space for the lower end of the bending portion of the flexible screen and reducing the thickness requirement for the middle housing: when the hinge is unfolded, the rigid support of the left and right rotating supports can be obtained and compressed by the elastic component, and the gap between the left and right middle support plates is very narrow.

DETAILED DESCRIPTION

Figure 1:
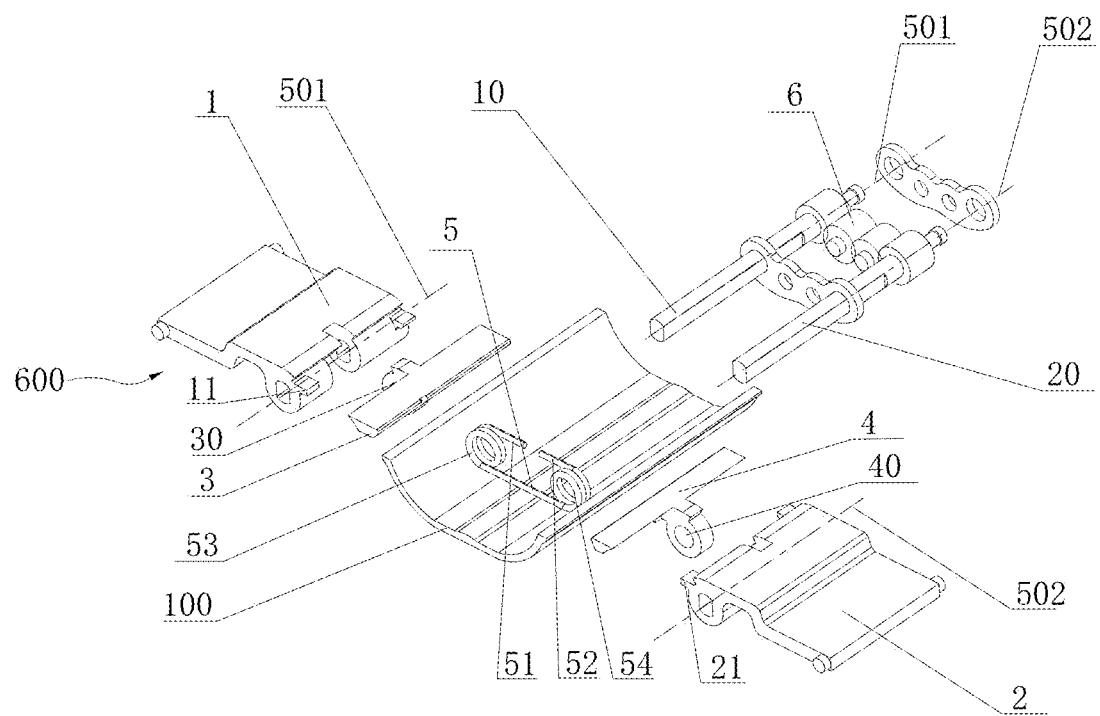
FIG. 1 is an exploded view of a structure of an embodiment of the present invention.
Figure 2:
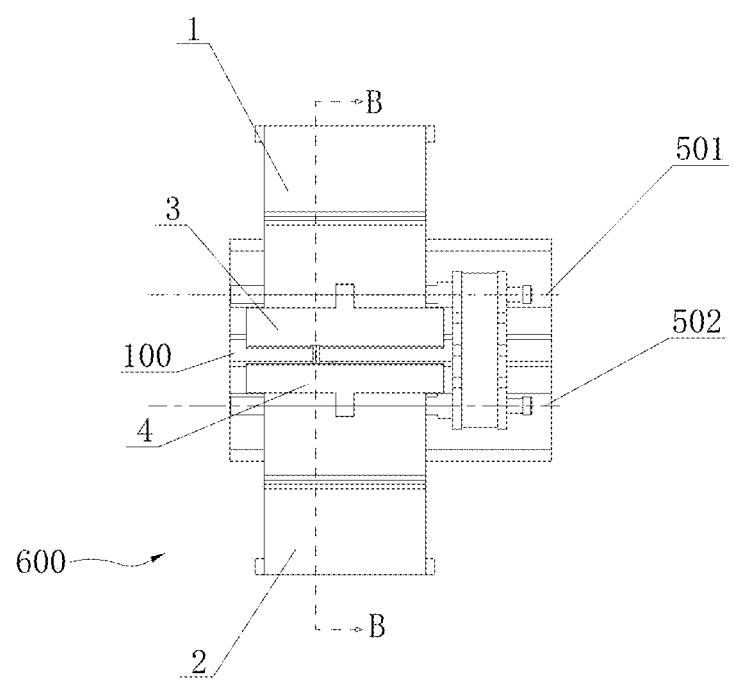
FIG. 2 is a schematic diagram of an embodiment of the present invention in the unfolded state.
Figure 3:
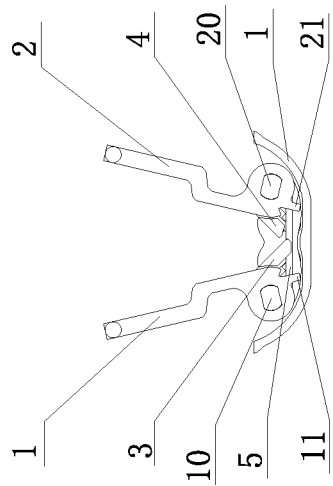
FIG. 3 is a left view of FIG. 2 of an embodiment of the present invention in the unfolded state.
Figure 4:
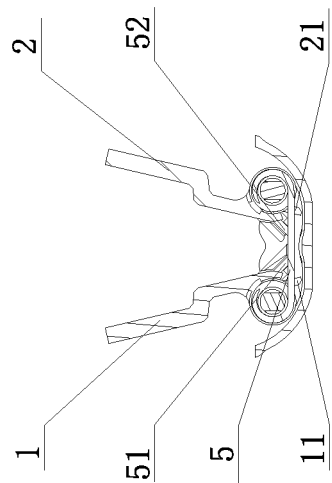
FIG. 4 is a B-B cross-sectional view of FIG. 2 of an embodiment of the present invention in the unfolded state.
Figure 5:
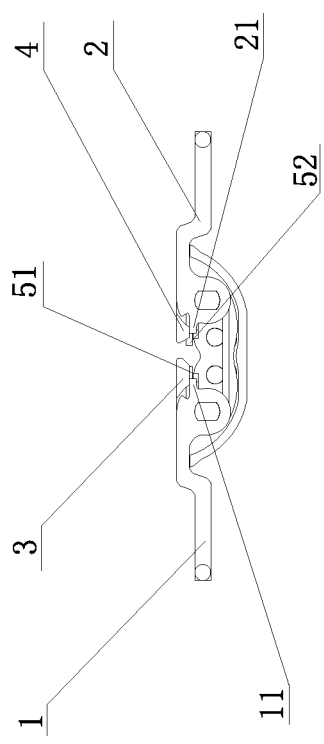
FIG. 5 is a left view of FIG. 2 of an embodiment of the present invention in the folded state.
Figure 6:
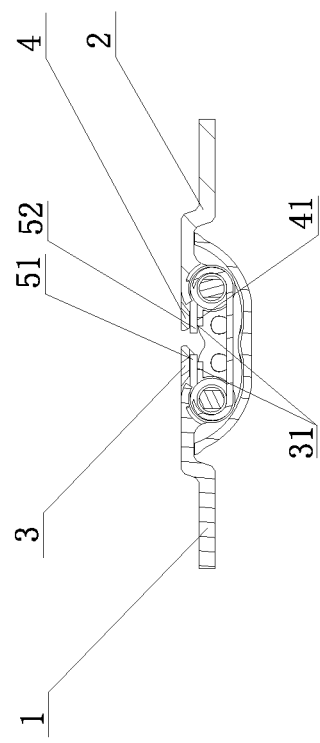
FIG. 6 is a B-B cross-sectional view of FIG. 2 of an embodiment of the present invention in the folded state.

Referring to the figures, the present invention provides a hinge 600, comprising a left rotating support 1 and a right rotating support 2, the left rotating support 1 and the right rotating support 2 can respectively rotate with a first axis 501 and a second axis 502 as axes respectively, and the first axis 501 and the second axis 502 are parallel. In the embodiment, the shafts of the left rotating support 1 and the right rotating support 2 are a first shaft 10 and a second shaft 20 respectively, which are solid shafts. A synchronous reverse rotation connecting mechanism (for example, a gear mechanism 6) is connected between the left rotating support 1 and the right rotating support 2 to perform synchronous reverse rotation during the unfolding and folding processes of the hinge 600.

The hinge 600 is further provided with a left middle rotating supporting component 3 and a right middle rotating supporting component 4; and the left middle rotating supporting component 3 and the right middle rotating supporting component 4 correspond to the positions of the middle housing 100 of the mobile terminal having an inward-foldable flexible screen. Both the left middle rotating supporting component 3 and the left rotating support 1 are sleeved on the first shaft 10, the left rotating support 1 and the first shaft 10 are connected together through a flatten portion to rotate synchronously, the shaft hole 30 of the left middle rotating supporting component 3 is a round hole and is rotatably connected to the first shaft 10; both the right middle rotating supporting component 4 and the right rotating support 2 are sleeved on the second shaft 20, the right rotating support 2 and the second shaft 20 are connected together through a flatten portion to rotate synchronously, the shaft hole 40 of the right middle rotating supporting component 4 is a round hole and is rotatably connected to the second shaft 20.

The left rotating support 1 and the right rotating support 2 are respectively provided with supporting parts 11, 21 for the left middle rotating supporting component 3 and the right middle rotating supporting component 4 during being unfolded, so that the left middle rotating supporting component 3 and the right middle rotating supporting component 4 obtain rigid support to provide stable support to the flexible screen when the hinge 600 is unfolded.

The left middle rotating supporting component 3 and the right middle rotating supporting component 4 are separately connected to an elastic component 5; and when the hinge 600 is folded, the elastic component 5 drives the left middle rotating supporting component 3 and the right middle rotating supporting component 4 to downwardly rotate so as to rotate into a middle housing 100 of the mobile terminal. The elastic component 5 can be arranged on the left and the right independently or can be preferably an integral structure of this embodiment. Both the elastic component of the left middle rotating supporting component 3 and the elastic component of the right middle rotating supporting component 4 are torsional springs and are connected together: two end arms 51 and 52 of the spring with an integral structure are connected to the openings 31 and 41 in the left middle rotating supporting component 3 and the right middle rotating supporting component 4 respectively. The integral spring is provided with a left spring coil 53 and a right spring coil 54, and the left spring coil 53 and the right spring coil 54 are sleeved outside the first shaft 10 and the second shaft 20 respectively.

The torsional spring is in a state of energy storage when the hinge 600 corresponding to the inward-foldable mobile terminal is in an unfolded state. When the hinge 600 is folded, the left middle rotating supporting component 3 and the right middle rotating supporting component 4 are driven by the elastic component 5 to downwardly rotate into a middle housing 100 of the mobile terminal until being blocked by a limiter, and the limiter can be arranged in the middle housing, in the process from unfolding to folding of the hinge 600, rotation angles of the left middle rotating supporting component 3 and the right middle rotating supporting component 4 are smaller than rotation angles of the left rotating support 1 and the right rotating support 2 respectively: in the process from folding to unfolding of the hinge 600, when the supporting parts 11, 21 of the left rotating support 1 and the right rotating support 2 are rotated to contact the left middle rotating supporting component 3 and the right middle rotating supporting component 4 respectively, the supporting parts 11, 21 drive the left middle rotating supporting component 3 and the right middle rotating supporting component 4 to rotate to a support position of the flexible screen, and in the support position of the flexible screen, the elastic component 5 compresses the left middle rotating supporting component 3 and the right middle rotating supporting component 4 on the supporting parts 11, 21.

The aforementioned unfolding and folding of the hinge 600 are in unfolded and folded states of the hinge 600 corresponding to an inward-foldable mobile terminal. The left middle rotating supporting component 3 and the right middle rotating supporting component 4 may be plate-shaped to directly support the flexible screen, or support plates may be fixed to the left middle rotating supporting component 3 and the right middle rotating supporting component 4 respectively to support the flexible screen.

The mobile terminal having an inward-foldable flexible screen comprises a middle housing 100, a left housing, a right housing and an inner flexible screen: the left rotating support 1 and the right rotating support 2 are respectively connected with the rotation directions of the left housing and the right housing in a constrained manner: the left housing and the right housing use the first shaft 10 and the second shaft 20 as the rotation shafts respectively, and the left housing and the right housing are respectively provided with support plates for the inner flexible screen.

The description only describes the specific embodiments of the present invention, but the structural features of the present invention are not limited thereto. Any changes or modifications made by those skilled in the art within the field of the present invention shall fall within the scope of protection of the present invention.

It should be noted that the terms "comprising" and "having" in the description and claims of the present invention and the accompanying drawings, as well as any modifications thereof, are intended to cover non-exclusive inclusion. The terms "installed/mounted", "arranged", "set", "connected", "sleeved" should be construed broadly. For example, it may be a fixed connection, a detachable connection, or an integral structure: it may be a mechanical connection, or an electrical connection: it may be directly connected, or indirectly connected through an intermediary, or between two devices, elements, or internal communication between components. For those of ordinary skill in the art, the specific meanings of the above terms in the present invention can be understood according to specific situations.

It should be understood that, in the description of the present invention, the orientation or positional relationship indicated by the terms "one end", "another end", "outside", "inside", "horizontal", "end", "length", "outer end", "left", "right", etc. is based on the orientation or positional relationship shown in the figures, and is only for the convenience of describing the present invention and simplifying the description, rather than indicating or implying that the indicated device or element must have the particular orientation, construction and operation in the particular orientation, therefore, it cannot be construed as limitations of the present invention. The terms "first", "second" are used for brevity of description only, and do not indicate or imply relative importance.

The invention claimed is:

1. A hinge, comprising a left rotating support and a right rotating support, the left rotating support and the right rotating support can respectively rotate with a first axis and a second axis as axes respectively, the first axis and the second axis are parallel, a synchronous reverse rotation connecting mechanism is connected between the left rotating support and the right rotating support to perform synchronous reverse rotation; wherein:

the hinge is further provided with a left middle rotating supporting component and a right middle rotating supporting component; the rotation axis of the left middle rotating supporting component is parallel to or coincides with the first axis, and the rotation axis of the right middle rotating supporting component is parallel to or coincides with the second axis;

the left rotating support and the right rotating support are respectively provided with supporting parts for the left middle rotating supporting component and the right middle rotating supporting component during being unfolded;

the left middle rotating supporting component and the right middle rotating supporting component are separately connected to an elastic component; and when the hinge is folded, the elastic component drives the left middle rotating supporting component and the right middle rotating supporting component to downwardly rotate so as to rotate into a middle housing.

2. The hinge of claim 1, wherein the hinge is provided with a first shaft and a second shaft, both the left middle rotating supporting component and the left rotating support are sleeved on the first shaft, the left rotating support and the first shaft are connected together to rotate synchronously, and the left middle rotating supporting component is rotatably connected to the first shaft; both the right middle rotating supporting component and the right rotating support are sleeved on the second shaft, the right rotating support and the second shaft are connected together to rotate synchronously, and the right middle rotating supporting component is rotatably connected to the second shaft.

3. The hinge of claim 2, wherein an elastic component of the left middle rotating supporting component is a torsional spring, and an elastic component of the right middle rotating supporting component is a torsional spring and the elastic components are connected together to be an integral spring, two end arms of the spring are connected to the left middle rotating supporting component and the right middle rotating supporting component respectively.

4. The hinge of claim 3, wherein the integral spring is provided with a left spring coil and a right spring coil, and the left spring coil and the right spring coil are sleeved outside the first shaft and the second shaft respectively.

5. The hinge of claim 1, wherein when the hinge is folded, the left middle rotating supporting component and the right middle rotating supporting component are driven by the elastic component to downwardly rotate into the middle housing until being blocked by a limiter, in the process from unfolding to folding of the hinge, rotation angles of the left middle rotating supporting component and the right middle rotating supporting component are smaller than rotation angles of the left rotating support and right rotating support respectively; in the process from folding to unfolding of the hinge, when the supporting parts of the left rotating support and the right rotating support are rotated to contact the left middle rotating supporting component and the right middle rotating supporting component respectively, the supporting parts drive the left middle rotating supporting component and the right middle rotating supporting component to rotate to a support position of the flexible screen, and in the support position of the flexible screen, the elastic component compresses the left middle rotating supporting component and the right middle rotating supporting component.

* * * * *